US009729596B2

(12) United States Patent
Sanghavi et al.

(10) Patent No.: US 9,729,596 B2
(45) Date of Patent: Aug. 8, 2017

(54) CONTENT PODS FOR STREAMING MEDIA SERVICES

(71) Applicant: Apple Inc., Cupertino, CA (US)

(72) Inventors: Mehul K. Sanghavi, Sunnyvale, CA (US); Sagar A. Joshi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 552 days.

(21) Appl. No.: 14/288,122

(22) Filed: May 27, 2014

(65) Prior Publication Data

US 2015/0350275 A1    Dec. 3, 2015

(51) Int. Cl.
| | |
|---|---|
| G06F 15/16 | (2006.01) |
| H04L 29/06 | (2006.01) |
| H04L 29/08 | (2006.01) |
| G06Q 30/02 | (2012.01) |

(52) U.S. Cl.
CPC ............ *H04L 65/60* (2013.01); *G06Q 30/02* (2013.01); *H04L 67/32* (2013.01)

(58) Field of Classification Search
CPC .................................................. G06C 30/0277
USPC ........................................................ 709/219
See application file for complete search history.

(56) References Cited

U.S. PATENT DOCUMENTS

| | | | |
|---|---|---|---|
| 8,713,603 B2 | 4/2014 | Kilar et al. | |
| 2006/0253330 A1* | 11/2006 | Maggio ................. | G06Q 30/02 705/14.2 |
| 2008/0177708 A1* | 7/2008 | Ayyar ............... | G06F 17/30899 |
| 2009/0222850 A1 | 9/2009 | Darnell et al. | |
| 2010/0228591 A1 | 9/2010 | Therani et al. | |
| 2011/0078002 A1 | 3/2011 | Leary et al. | |
| 2013/0205315 A1 | 8/2013 | Sinha et al. | |
| 2015/0100999 A1* | 4/2015 | McKenna .......... | H04N 21/4307 725/116 |

* cited by examiner

Primary Examiner — Hamza Algibhah
(74) Attorney, Agent, or Firm — Polsinelli LLP (57) ABSTRACT

Methods and arrangements are provided for the generation and assembly of content pods for playback within an online streaming media service. A content pod is assembled to contain personal content that is relevant to an end user. In some embodiments, personal content can consist of traffic updates, voicemail messages, text messages, social media updates, and personal status updates. A content delivery system determines what personal content is available on the user device through connecting to available information sources. The delivery system then assembles the content pod from these elements in addition to invitational content from content providers. In some embodiments, a bumper message is included in the content pod to provide a context for the elements that are being assembled in combination with each other. Once the content pod is generated, it is sent to the user device to be played during content breaks within the online streaming playback.

25 Claims, 5 Drawing Sheets

CONTENT PODS FOR STREAMING MEDIA SERVICES

TECHNICAL FIELD

The present technology pertains to streaming media services, and more specifically pertains to the generation of content pods within a streaming media service to facilitate the delivery of relevant personal content alongside invitational content from content providers.

BACKGROUND

Online streaming media services, such as online radio, streaming music services, and streaming movie services, appeal to end users' preferences for the instant accessibility of media content, portability, and convenience. Such services increasingly work across multiple devices and settings, allowing the same streaming content at a desktop computer at home, at a smart phone during a car commute, or at any other device and virtually any location. These services are also capable of drawing a vast library of streaming content via a network connection and presenting it in a number of possible ways. Such streaming media services also appeal to advertisers or content providers by providing opportunities to access specific, captive audiences. Advertisers typically provide invitational content, such as a product or service advertisement, that is selected to appear within a pod of invitational content. This pod of content is played in certain intervals between pieces of media content, or in the middle of a single piece of media content.

These ad breaks, or "ad pods", as they are sometimes referred to, are a traditional model of advertising that has also been employed on both the television and radio formats for decades. The "ad pod" is a construct whereby media broadcasters can insert a commercial break containing a sequence of ads into a block of programming. Each commercial break or ad break can contain one or more sequential ads which play up until the duration of the ad pod, after which the primary content the user was seeing or hearing is resumed.

Ad pods are often seen as a difficult and ineffective way to engage users. Users that were previously focused on media content are wary once the pod begins, and tend to either lose interest and engagement after the first advertisement in the pod, concentrate on something else, or skip the ad pod completely if such a function is available. With the advent of such technologies as Digital Video Recorders (DVRs), new user interfaces and ad bypassing methods, it is more likely that a user will skip an ad pod than in the past. At the same time, the benefits of the traditional ad pod—monetization for advertisers and the streaming service provider—continue to be crucial.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating and transmitting content pods for presentation in an online media service. Like the notion of ad pods discussed above, content pods are a sequence of pieces of content to be played during a commercial break or between two pieces of media content during a playback session. Content pods differ from ad pods by potentially including not only invitational content from content providers, but also additional content that is personally relevant to users. This additional content can be culled from various information sources that a user receives information from. By using this additional content, a content provider can sponsor particularly engaging advertising breaks, rather than the traditional ad pod sequence consisting solely of invitational content. For example, in an online music streaming service, an advertiser may be able to sponsor one or more content pods in one or more streaming stations that contain a variable length pod break. The length of the pod can be extended depending on the user's engagement with the pod contents. In operation, information relevant to the user can be collected and combined into the content pod.

Information sources may include, for example, social media sites such as Facebook and Twitter; services that provide real-time traffic updates; voicemail or text message services from the user's phone; calendar applications; instant message services; and more. A wide variety of personal content is possible from such information sources. For example, twitter messages from close friends, voicemail messages, unread work emails, important calendar appointments, Facebook status updates, and other possibilities exist for personal content. The content pods provide a user with such personal content, combined with a message and/or invitational content from providers. In this way, users remain fully engaged and active during a commercial break, while content providers still get the benefit of getting messaging and content across to the users.

Content pods can also include bumpers to provide context for the personal content and invitational content which can be inserted into the content pods. Bumpers may consist of pre-content messages introducing the content a user is about to be presented with. Bumpers may also consist of post-content messages, explaining which content provider sponsored the particular content pod. In addition, mini-bumpers can be included to introduce each individual piece of content before it is presented.

In a preferred embodiment, a request for a content pod is sent from the user's device to a content delivery system. The content delivery system then connects to one of the information sources that a user is associated with, and ingests personal content that is considered relevant and recent. The content delivery system then determines which pieces of personal content to be included within the specific content pod, based on a set of content pod rules, a set of user preferences, and a set of content provider preferences. The content delivery system also determines which pieces of invitational content to be included, if any. Bumper messages are also determined to be included. Finally, the content pod is assembled into a contiguous whole containing the personal content, invitational content and bumper messages. The content pod is then transferred to the user device, and scheduled for the next available content break or a future content break.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an improved means of presenting a user with personal engaging content during a sponsored commercial break. The disclosed technology provides users with information that is useful and highly relevant to their concerns or interests, while providing content providers with the ability to "piggyback" on the presentation of this personal content to present invitational content and messaging to users.

Figure 1:
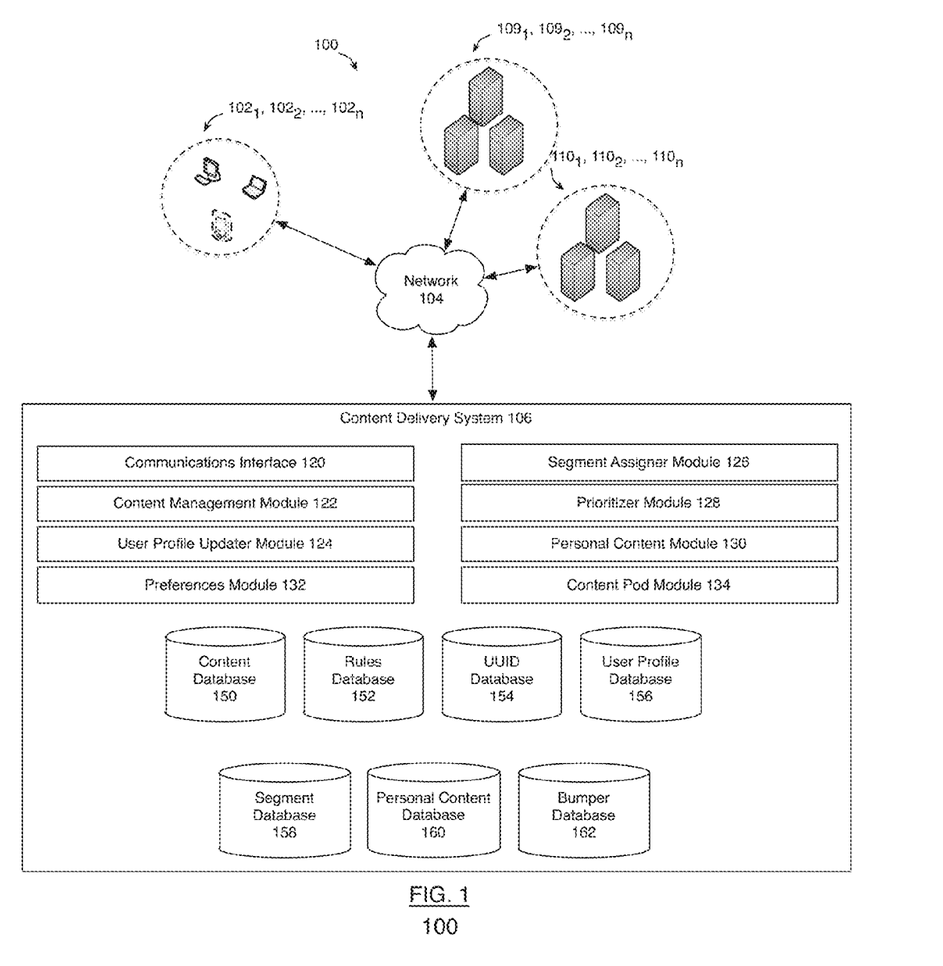
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, . . . , $109_n$ (collectively "109") and content from one or more secondary content providers $110_1$, $110_2$, . . . $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal 102. A subsequent content package can include one or more items of invitational content that can be presented to a user of the user terminal 102, while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In an exemplary embodiment, the content delivery system 106 is capable of ingesting information that is personally relevant to a user, and assembling that personal content along with invitational content from content providers. When assembled together, the content forms a content pod that can be sent to a user. The following modules within the content delivery system 106 in this embodiment pertain to ingesting personal content from various sources, and assembling content pods containing this personal content.

The content delivery system 106 provides a personal content module 130. The purpose of the personal content module 130 is to connect to specific authorized information sources, receive personal content, and determine whether and how the personal content can fit within content pods. First, the personal content module 130 receives information from the user terminal device 102 about specific authorized information sources. Such information sources are communicated by the user terminal device, along with a way to connect to the content within the information device. In an exemplary embodiment, this can involve an API connection and some form of authorization between the information source and the content delivery system 106. An "opt-in" authorization can be required from the user before any connection takes place between the content delivery system 106 and any information source.

Information sources that contain relevant personal content may be any source within a smart phone, desktop, tablet, website, video game, interactive media, application, or other outlet for content. The information sources can potentially include, for example, social media services, including Facebook and Twitter; a source for traffic updates, tied to the user's location; text messages and voicemails on a phone; calendar applications; instant messaging services, including iMessage or GChat; email applications; news sources; a fitness tracking device, such as FitBit; and a notifications center within a device.

Personal content pieces can be formed from any of the above information sources and other conceivable sources, and can potentially include, for example, traffic updates; voicemails; social media updates; Facebook content; Twitter content; social updates with user-initiated feedback; calendar appointments; instant message readouts; personal status updates; metrics from sensor data, such as a fitness tracking device; top news summary highlights or breaking news; and other programming.

Once the personal content module 130 connects to an information source, it follows a set of personal content rules for determining how to extract relevant personal content from that information source. For example, if the personal content module 130 is authorized by the user terminal device 102 to connect to the social media service Twitter, then it must determine what the relevant personal content is within that social media service. If the connection allows the personal content module 130 to access the Twitter posts or "tweets" from the user, mentions from the user's Twitter followers, private direct messages from the user's Twitter followers, and other sources of content, then the personal content rules may specify that the module is to use unread mentions and direct messages from that Twitter account as the basis for personal content. Alternatively, the rules could specify tweets from a user's customized list of Twitter accounts that he or she is following. For example, a list comprised solely of family members and close friends could be deemed important personal content that is worth sharing in a content pod. The personal content module 130 is capable of ingesting this important personal content, and storing it within a personal content database 160.

When extracting personal content from an information source, the personal content module 130 also extracts a read/unread status tied to that personal content, if the information source includes this information and allows it to be extracted. Each piece of personal content inserted into a content pod has its own read/unread status with respect to the information source presenting the data. Thus, for example, if a user has been presented with a voicemail message in a content pod, then the voicemail message can be marked as read or heard within the playback application of the user's device. Similarly, the voicemail message is marked as read or heard within the information source, and the notification may be removed within the information source. In some embodiments, users can elect within a user preferences setting for the pieces of personal content to be marked as unread within the information source, even if they are read or heard within a content pod.

In some embodiments, the personal content database 160 contains a preferences module 132. The preferences module 132 receives user preferences from the user terminal device 102. The module also receives provider preferences from the primary and secondary content providers 109 and 110. The user preferences filter out the types of personal content and invitational content that a user is interested in seeing during the content pods. The provider preferences control the types of content that the provider wishes to combine in a content pod. Both sets of preferences can allow for a broad or granular filter for the content that is shown to a user through the content pods. User preferences can originate on a user device, and can be modifiable by a user through a media service application.

An example of a user preference can include only wishing to see personal content related to work-related emails, messages and contacts, and setting up the content pod experience to be work-oriented. Another example can be stipulating that only social media updates from friends should be considered relevant in a content pod. User preferences can generally be tied into content assembly in this way, and specifically the direction that content should be privileged towards when assembling content pods. In some embodiments, a user's preferences can change and evolve depending on the user's reactions to content that is shown to that user. For example, a portion of the user interface may give the user the option to communicate that the user did not like that content pod, and does not wish to receive content pods like it in the future. This updates the user preferences with that preference. Another example can be a user electing for no more than a certain number of most recent updates from each of the information sources to be presented in content pods.

Provider preferences can also direct the content in a granular fashion, in terms of cost, content preferences, and targeting. A provider may wish to specify that particular kinds of users should only receive a fifteen-second content pod, while other kinds of users should receive a more expensive thirty-second or sixty-second content pod. Targeting the kind of users, and the types of personal and invitational content users should receive, can be adjusted by the provider and taken into account by the preferences module 132. In addition, a provider can specify when a pod is to be shown, what genres of music or video are appropriate for particular kinds of pods, and what kinds of media content should never be associated with content pods from that provider. In some embodiments, a provider can allow another content provider to sponsor half of the content pod, and allow some of that other content provider's invitational content to appear in the content pod as well. In some embodiments, a content provider can elect on the user's behalf what types of personal content to include in content pods. For example, the content provider can specify that only social media updates should be included with the content pod, not voicemail messages. A content provider may also specify the time within a day the content pod should be presented to the user. For example, a content provider may wish for a content pod to only be played between the hours of 9:00 AM and 7:00 PM.

The preferences module 132 takes into account these preferences from providers and users, and resolves any conflicts between them. For example, if a provider wants a content pod to feature a specific type of personal or invitational content that a user has requested not to receive, then the preferences module 132 resolves this in a way that is consistent with the content delivery system 106 as a whole. In a preferred embodiment, the preferences module 132 will privilege the user's preferences over the content provider's preferences, and determine alternate pieces of content that satisfy both the provider and the user. In some embodiments, the preferences module 132 will have standby or backup content that will be shown that a user has not objected to.

Once the preferences module determines the user preferences and provider preferences, resolves conflicts, and ensures that the content in question corresponds to the preferences, then the content pod module 134 assembles the content pod from the chosen personal content and invitational content. This involves "stitching" the disparate pieces of content into a single, coherent framework that can be presented to a user. The content pod module 134 is configured to determine which format the pieces of content are in. For example, pieces of content that are in audio format are assembled to be presented in a framework that is audio-based, and either does not have a visual component or has a standard template visual component that is used as a background or interface for the audio-based content. As another example, a mixture of audio and visual content would include a presentation that stitches together both audio and visual components to be presented to a user. A set of content pod rules is used by the content pod module 134 to determine how pieces of content in various formats are to be presented.

In addition, some embodiments include the content pod module 134 inserting one or more "bumper" components into the content pod to be presented to the user. Bumpers are introductory (pre-content) or conclusory (post-content) messages that provide a context for the content pod experience. In some embodiments, a pre-content bumper is added to the beginning of a content pod, informing the user that the content pod is brought to the user by the content provider. After that, the content pod module 134 will display the ingested personal content that the personal content module 130 has deemed relevant and appropriate for the content pod. In addition to pre-content bumpers and post-content bumpers, each of the pieces of personal content can also contain its own mini-bumper component, explaining what the personal content is and/or from which information source it was taken from. Mini-bumper statements can be visual, such as written text, or audio statements that are presented to the user. Examples of such mini-bumpers can include, in various phrasings:

"Traffic updates for the road you're driving on include the following."

"While you were listening to music, the following voicemail was received."

"The following social updates may pique your attention."

"These are the trending news topics for today."

"The following messages were received in chronological order."

Post-content bumpers are possible as well for each content pod, in the instance that a content provider wishes to sponsor a content pod that is long enough to fit one. While a fifteen-second content pod is likely too short for a bumper, a sixty-second content pod may be enough space for both a pre-content bumper and a post-content bumper to be added. An example of a post-content bumper may be, "We hope you enjoyed this break, brought to you by Apple."

Since the possibility of bumpers stating the content provider's name exist, there can be instances where no invitational content from the content provider is necessary. Some content pods may consist solely of a pre-content bumper, personal content (such as an unheard voicemail message) and a post-content bumper. Such content pods may be advantageous in engaging a user while still allowing some branding from the content provider to be expressed.

The content pod module 134 is capable of receiving personal content from the personal content module 130 and personal content database 160, as well as invitational content from the content management module 122 and content database 150, in addition to instructions from the preferences module 132 for what content is relevant and specific to both user and content provider preferences. The content pod module 134 then assembles the content pod from these sources, including an appropriate pre-content bumper, post-content bumper, and/or mini-bumpers based on content pod rules.

When the content pod module 134 assembles a content pod for presentation, it may also take into account various factors of how the user is currently interacting with the online media service. In the case of a music streaming service, contexts such as music genre or station may be taken into account. In the case of a video streaming service, contexts such as the television channel or type of programming may be taken into account. The content pod rules will accordingly define the frequency of content pod insertion, in addition to other possible metadata such as pod length and the ability for the pod to be skipped. The content pod module 134 may also take into account whether the user is actively engaged or passively engaged, whether the user is engaged in a visual way or other interactive way, and more. Engagement and input may be measured by activity through, for example, keyboard, personal area network devices (e.g., Bluetooth devices), or microphone commands. If a user is engaged and capable of input, the content pod module 134 may determine that an interactive content pod should be presented, which allows for the user to issue commands and answer questions that are posed by the content pod.

When the content pod module 134 is finished stitching together the pieces of content into a contiguous whole, the assembled content pod is transmitted to the user terminal device 102, along with data on a determined scheduled playback time. The scheduled playback time is determined to fall into the next upcoming invitational content slot. Invitational content slots are predetermined breaks in the media playback where invitational content is meant to be presented to a user. By scheduling the content pod to be presented at the next available invitational content slot, the content pod module 134 is able to present relevant content to a user in a timely fashion. In some embodiments, the content pod module 134 can be capable of scheduling one or more pods ahead of time, beyond the next invitational content slot and into future invitational slots. Such future scheduling and content pod placement may be determined by the user's listening behavior as well as consumption patterns.

While the content delivery system 106 is presented with specific components, it should be understood by one skilled in the art, that the architectural configuration of system 106 is simply one possible configuration and that other configurations with more or less components are also possible. For example, in some embodiments the user terminal device 102 may contain the personal content module 130 and the personal content database 160, and the processing of personal content is done by the local playback application on the user's device. In such embodiments, none of the user's personal content gets sent to the content delivery system 106, and the content delivery system 106 does not communicate with any information sources. Instead, a user authorizes the local media service application on his or her device to access the data that the user is already accessing on the device. Only metadata gets passed on to the content delivery system 106. The personal content never leaves the device, and is locally played back in-stream during the content break. As another example, the content delivery system 106 may not assemble the content pod via the content pod module 134. Rather, metadata gets sent to the user terminal device 102 from the content delivery system 106, and personal content and other content is assembled into a content pod entirely on the local device. In such a configuration, parts of the content pod module 134 described above would exist on the user terminal device 102, not the content delivery system 106. In other embodiments, the user terminal device 102 is capable of connecting to information sources and generating the personal content to be used in the content pod. The user terminal device 102 then sends a request for the content delivery system 106 to provide the invitational content from content providers, bumper messages and other aspects of the content pod. The content delivery system 106 then sends those pieces back to the user terminal device 102. The user terminal device 102 is then tasked with stitching and assembling those pieces, along with the personal content, into the finished content pod. In such a configuration, the user terminal device 102 generates the personal content and assembles the finished pod, while requesting the content delivery system 106 to provide the rest.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
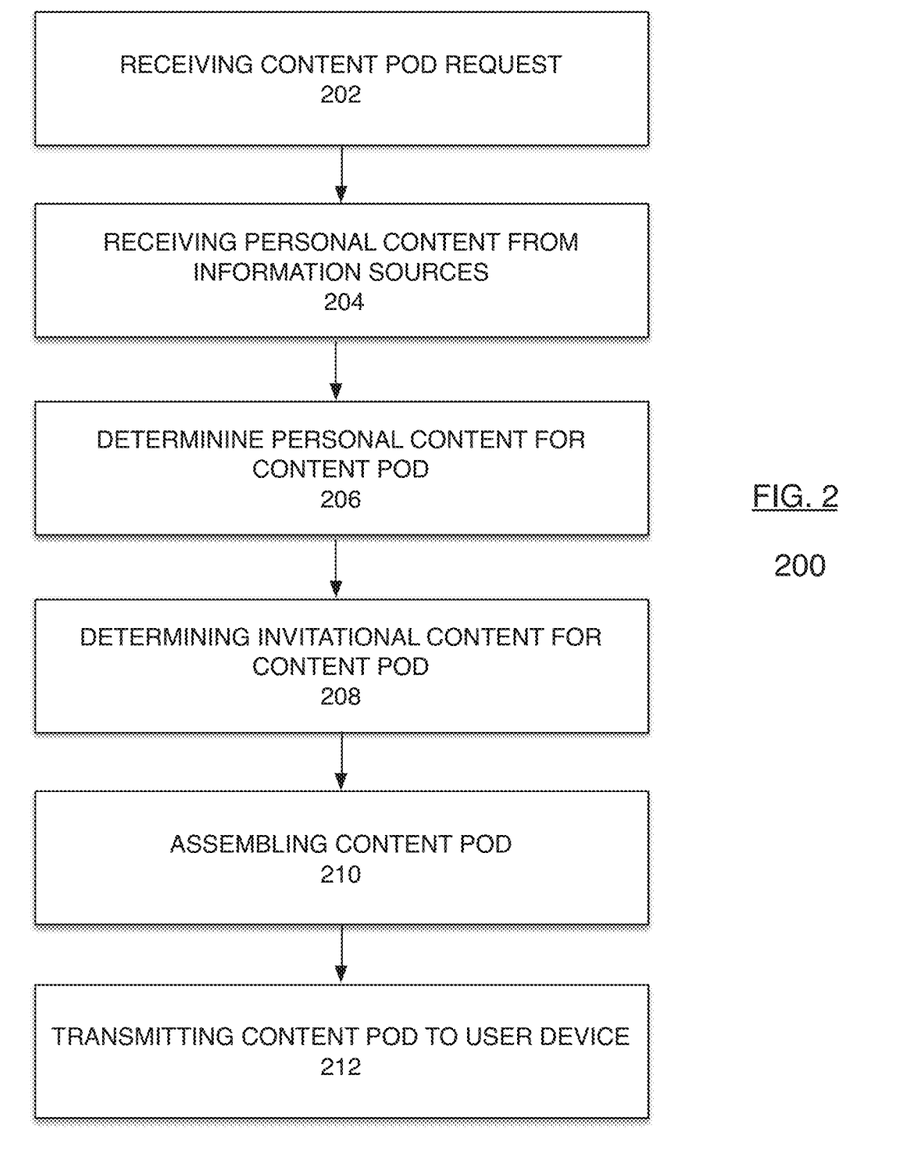
FIG. 2 illustrates an exemplary method embodiment.

Turning now to FIG. 2, an operation of the content pod generation and transmission will be discussed in greater detail. FIG. 2 is a flowchart of steps in an exemplary method 200 for generating a content pod and transmitting it to a user device for playback. For ease of illustration, the steps of method 200 will be described with respect to a server-centric configuration. That is, an embodiment in which a server assembles a content pod and delivers the assembled content pod to a user device. However, the steps shown in FIG. 2 can be carried is a substantially similar way in embodiments where some or all of the steps for assembling and presenting a content pod are performed at a user device, as described above.

Method 200 begins at step 202, where a content pod request is received. For example, in a server-centric embodiment, the content pod request can be received by the content delivery system 106 from a user terminal device 102. The content pod request may be sent out by the media service application within the user terminal device 102, in response to an internal message that the media service is playing back media content and will be in need of a content pod at some point during the playback. The content pod request can consist of information about the user media session in progress, including, for example, the genre of music listened to, the TV channel selected, or whether the user is passive or engaged with the media service. The user terminal device 102 also sends information about user preferences for content pods. User preferences, as discussed above, include information about what a user permits or prohibits regarding the personal content and invitational content that is selected for inclusion in a content pod.

At step 204, personal content from information sources is received by the content delivery system 106, via the personal content module 130. First, the personal content module 130 connects to an information service. An information service may be a social media service, an application on the device, a voicemail service, a service that provides real-time traffic updates, or any source that provides information that is targeted to a user and pertinent to that user. The personal content module 130 connects to the information source via an API connection, authorization, or other way of establishing communication with the source. In some embodiments, the user must strictly "opt in" to allow any form of connection to occur between the media service and the information source.

Once the personal content module 130 connects to the information source, it determines what the relevant pieces of personal content are that are recent, unread, and pertinent to a user's needs and interests. It may do this by a set of element selection rules that determine what pieces of content are important within a given information source.

At step 206, the content pod module 130 and the preferences module 132 determine what specific pieces of personal content are to be included in the content pod to be generated. This is accomplished based on the set of user preferences that were included in the content pod request, along with a set of content provider preferences, and a set of content pod rules. This may also be accomplished with additional aspects, such as the user engagement, kind of media content being played, and more. The set of content provider preferences are received by a content provider which has sponsored a content pod to be presented to a user. The content provider preferences, as discussed above, specify targeting of certain pieces of invitational content to certain users, as well as price of content pod content, and other preferences. The content pod rules specify how the content pod module 130 and the preferences module 132 should take into account the various pieces of information when determining how to assemble the content pod. Content pod rules may privilege the user preferences over the content provider preferences, for example, or specify that certain genres of music in media content should correspond to certain kinds of content pods being generated, with specific pieces of personal content included.

At step 208, the content pod module 130 and the preferences module 132 determine which pieces of invitational content from sponsoring content providers are to be included in the content pod. This is done in a similar fashion to the decisions made regarding personal content to be included in the content pod. Content pod rules, user preferences and content provider preferences are each taken into account. In addition, elements of the current session may be considered, such as user engagement, kind of media content being played, and more.

At step 210, the content pod is assembled. The assembly is executed by drawing together the selected pieces of personal content and selected pieces of invitational content into a contiguous whole to be presented to the user. In addition, the content pod may also be assembled to include a pre-content bumper, post-content bumper, and/or one or more mini-bumpers per piece of personal content and piece of invitational content.

Finally at step 212, the assembled content pod is presented at the user device. This can involve transmitting the content pod to the user device The content pod is scheduled to be presented to the user at the next content break within the media playback, or scheduled for a future content break.

In some embodiments, a user may have access to a premium or special subscription of the media service which allows for ad-free content pods. In such embodiments, no invitational content is selected from content providers, and bumpers do not contain any reference to specific content providers. Instead, personal content is selected and presented to a user as if content providers and invitational content are not to be factored in to the experience. Content pod rules may be set up to specify special instructions in such instances.

In additional embodiments, a user may request a station or playback that is composed entirely of a series of content pods. For example, a user may request twenty minutes of content pods without any other media playing. The user would simply receive personal content and invitational content in an uninterrupted fashion for those twenty minutes, as the content delivery system 106 continuously schedules one content pod to be presented after another.

In some embodiments, a special "interactive" or "engaged" mode may be triggered by a user or by the media service. In such instances, users do not simply passively consume the content within a content pod. Instead, they receive pieces of personal content that are hyper-targeted toward them, and provide responses back to engage with the content right within the online media service. For example, during a media service session executed while the user is driving in a car, the media service may present the user with a hands-free audio-based interactive experience with the content pod. The content pod can include a message saying, for example, "It is Ed's birthday today. Would you like to leave him a message?" If the user audibly responds with a yes, then the content pod may prompt him to leave a message, which the user can do vocally without pressing any buttons. In this fashion, a varied number of possibilities and scenarios exist for interactive content pods and user engagement.

Figure 3:
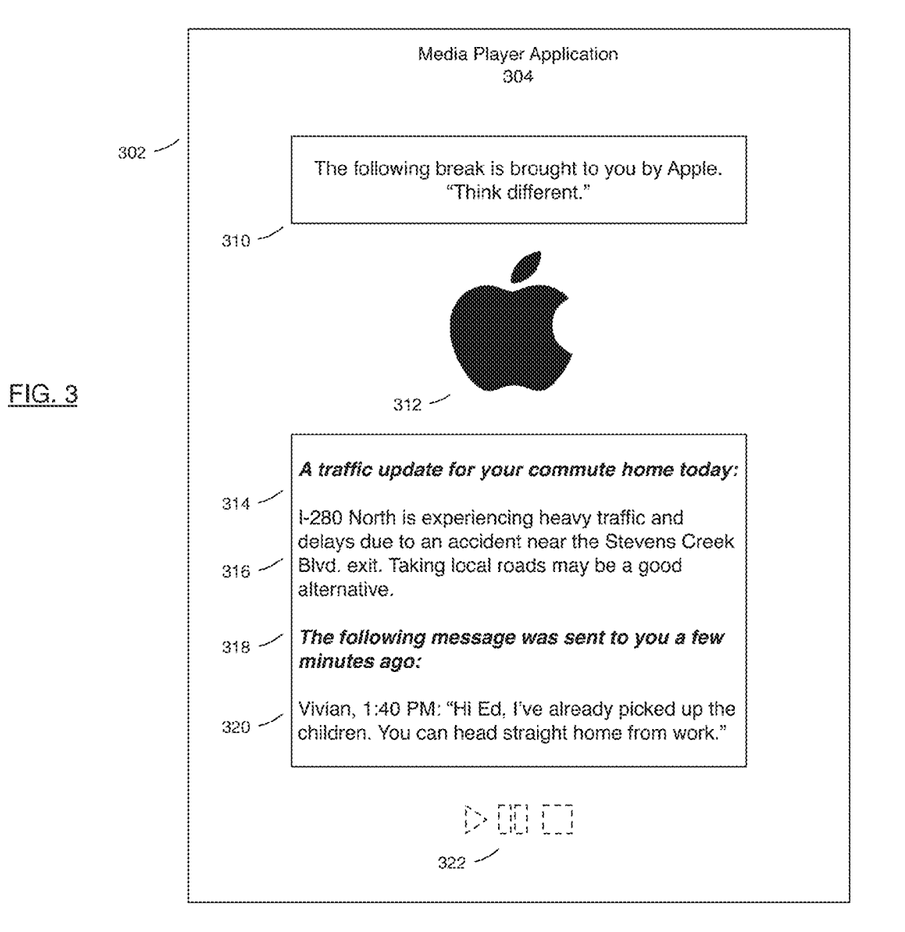
FIG. 3 illustrates an exemplary embodiment of a content pod presented on a user device.

Turning next to FIG. 3, an exemplary embodiment of a content pod presentation on a user device will be discussed in greater detail. User device 302 is presented in this embodiment as a tablet device that a user is operating the media service on. The content delivery system 106 receives information from the user device 102 about the kind of device and screen dimensions that is present in the user device 102, and assembles the content pod to fit within the specific limitations of the user device and screen. The media service is able to run on the user device through a media pervice application 304. The media player application presents an interface for a user to interact with, and displays visual and textual information relating to the media service playback and operation. In this embodiment, the interface of the application displays a content break which has occurred in the middle of the playback of media content. The device has detected that the user is engaged visually with the user device, and thus has prepared and assembled a content pod that is visually-oriented. In addition, there can be audio components to this content pod. In other examples and embodiments, content pods that are fully or partially audio-oriented may be presented, as well as content pod that have audio interactive components in conjunction with a user device 302's microphone input.

A pre-content bumper message 310 is displayed at the top of the content pod presented. One or more bumper messages may appear within a content pod visually or aurally, and contain short messages providing context for the user, and linking the content break with the sponsoring content provider or content providers. Bumper messages may be either pre-content, introductory messages, or may be post-content, conclusory messages. In this embodiment, the content pod displays the message "The following break is brought to you by Apple. 'Think different.'" The second sentence is a slogan or short message that a content provider can include within the bumper message. Below the bumper message, a content provider logo 310 is displayed. The logo gives the user a visual link to the content provider and brand that has sponsored the content break. A content provider can opt to not include a logo or slogan within a content pod. The logo section can also be replaced by a video, interactive section, or other piece of invitational content.

Below the logo, the main text field for personal content is presented. Mini-bumper messages 314 and 318 are displayed prior to their respective personal content messages 316 and 320. Mini-bumper messages may optionally be displayed in a content pod to provide a user with contextual information for the personal content that is presented. The mini-bumper message 314 presents an introductory message for a traffic update. In some embodiments, content pods can perform some predictive processing and analysis of past user behavior to determine what information is relevant to a user. In this embodiment, an information source for traffic updates is connected to by the content delivery system 106, and personal content rules have specified that the user takes a specific route home on workdays. The content delivery system 106 thus displays a message on unusual traffic delays on the user's typical route home.

The mini-bumper message 318 presents introductory context for personal content related to a voicemail message that was received on the user's phone. In some embodiments, the content delivery system 106 is capable of transcribing audio messages that are received from information sources, in order to be presented in visual text format for a content pod. Alternatively, a transcription service external to the content delivery system 106 may be connected to and utilized for efficient use of server resources. The personal content message 320 is displayed with a transcribed message that has been sent to the user recently. Once the content pod is over, the user can opt to have the voicemail message marked as read within the content delivery system 106, and marked as heard within the user's phone voicemail system. Thus, the same message won't appear in a future content pod, and the user won't see a notification for an unheard voicemail message in the user's phone.

Below the personal content message is a navigation bar 322 containing buttons for playing, pausing, and stopping media content. In this embodiment, the navigation bar 322 is grayed out and inaccessible on a temporary basis, as the content pod has an allotment of time in which a user cannot proceed to playback of media content. The allotment of time may last for fifteen seconds, thirty seconds, or sixty seconds, for example, depending on the length of time a content provider has sponsored for the particular content pod. Once the allotment of time is up, the user may click use the navigation bar to proceed with the next piece of media content, or the content pod may automatically proceed to the next piece of media content.

While the exemplary embodiment displays personal content, bumper messages, and a content provider name, slogan, and logo, other content may appear within a content pod. In some embodiments, equal visual space can be given to a personal content area and an invitational content area. The personal content area may contain content relating to traffic updates, voicemail messages and other personal content, while the invitational content area may provide content specific to a content provider's advertising campaign, or other invitational content. In other embodiments, the content provider's logo can be replaced by visual or textual invitational content. In still other embodiments, the personal content area can be presented visually, while invitational content is presented aurally. Several such configurations can exist which provide many possibilities for the layouts and presentations of content pods.

While the exemplary embodiment of a content pod presentation in FIG. 3 is presented with a specific arrangement and components, it should be understood by one skilled in the art that the configuration shown is simply one possible configuration, and that other configurations with different arrangements and more or less components are also possible. Variations on content pods are possible in many configurations, and are not limited by specific screen size, devices, device inputs, device outputs, or other limitations that are presented in the exemplary embodiment shown. In addition, the content can be shown concurrently or in sequence. The arrangement can vary from device to device, and from media application to media application.

Figure 4A:
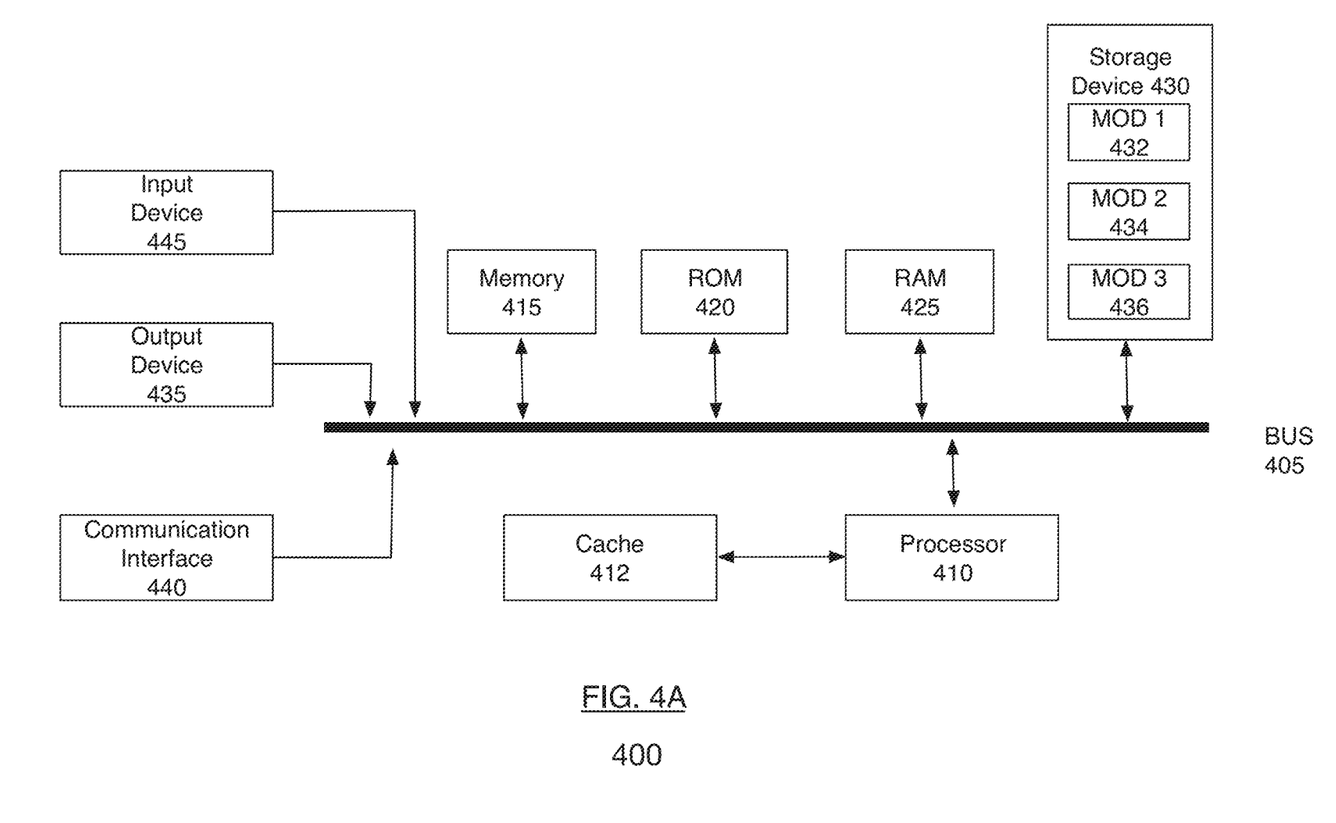
FIG. 4A and FIG. 4B illustrate exemplary system embodiments.
Figure 4B:
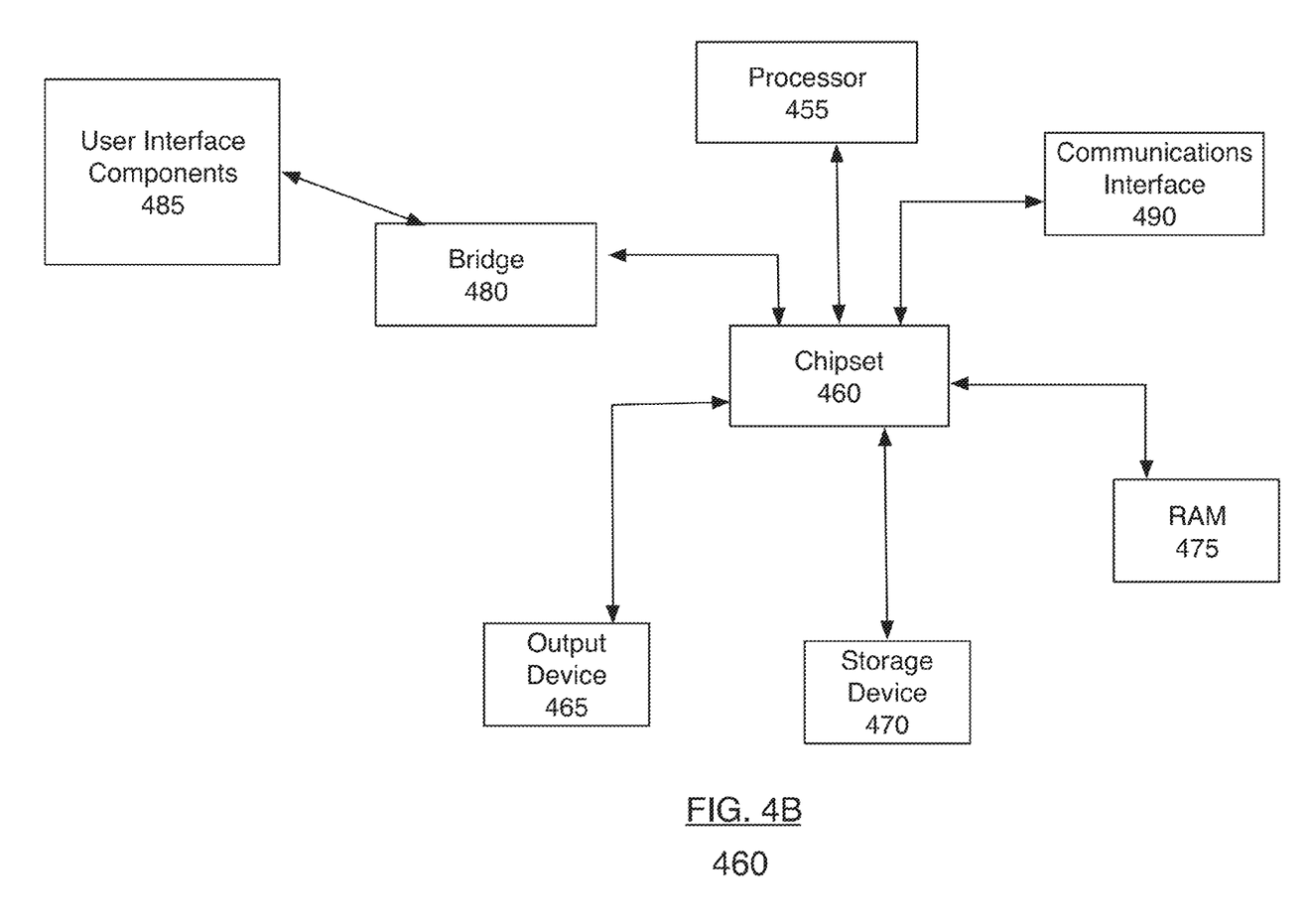

FIG. 4A, and FIG. 4B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method, comprising:
identifying one or more content breaks corresponding to a media playback session associated with a client computing device;
generating for a content pod customized for presentation at the one or more content breaks to a user associated with the client computing device, wherein generating the content pod comprises:
connecting to one or more information sources containing personal content corresponding to the user;
retrieving, from the one or more information sources, a personal content element comprising a communication message associated with the user, the communication message having an unread status; and
combining the personal content element and at least one of a bumper message describing the personal content element or an invitational content item; and transmitting, to the client computing device, the content pod and data correlating the content pod with the one or more content breaks.

2. The method of claim 1, wherein the one or more information sources comprise an application on the client computing device containing data associated with the user.

3. The method of claim 1, wherein the communication message comprises at least one of an unread voicemail message at the client computing device or an unread text message at the client computing device.

4. The method of claim 1, wherein the generating the content pod comprises assembling together the personal content element and the at least one of the bumper message or the invitational content item into a contiguous whole, based on a set of content pod rules that determine how content should be presented in the content pod.

5. The method of claim 1, wherein retrieving the personal content element comprises searching the one or more information sources for the personal content element without search input from the user.

6. The method of claim 1, wherein the bumper message comprises a message describing the personal content element or introducing the personal content element.

7. The method of claim 1, wherein the one or more information sources comprise the client computing device, wherein the data corresponding to the user comprises content stored at the client computing device.

8. The method of claim 1, wherein the communication message comprises a social media update associated with a social media account of the user.

9. The method of claim 1, wherein the bumper message comprises a pre-content bumper message scheduled for playback prior to the personal content element or a post-content bumper message scheduled for playback after the personal content element.

10. The method of claim 1, wherein at least one of the personal content element or the bumper message is based on a past user behavior of the user.

11. A non-transitory computer-readable medium storing computer executable instructions which, when executed by one or more processors, cause the one or more processors to:
identify one or more content breaks corresponding to a content playback session associated with a client computing device;
generate a content pod customized for presentation at the one or more content breaks to a user associated with the client computing device, wherein generating the content pod comprises:
obtain a personal content element associated with the user, the personal content element comprising a communication message selected based on a respective read or unread status associated with the user; and
combine the personal content element and at least one of a bumper message describing the personal content element or an invitational content item scheduled for the one or more content breaks; and
transmitting the content pod to the client computing device.

12. The non-transitory computer-readable medium of claim 11, storing additional computer executable instructions which, when executed by the one or more processors, cause the one or more processors to schedule the content pod for playback at the one or more content breaks in the media playback session based on a set of slot optimization rules.

13. The non-transitory computer-readable medium of claim 11, wherein the generating the content pod comprises assembling together the personal content element and the at least one of the bumper message or the invitational content item into a contiguous whole, based on a set of content pod rules that determine how content should be presented in the content pod.

14. The non-transitory computer-readable medium of claim 11, wherein the communication message comprises an unread voicemail message at the client computing device or an unread text message at the client computing device.

15. The non-transitory computer-readable medium of claim 1, wherein the bumper message comprises a pre-content bumper message introducing the personal content element prior to playback of the personal content element.

16. The non-transitory computer-readable medium of claim 11, wherein the personal content element comprises an update associated with a social media account of the user.

17. A computer implemented method, comprising:
receiving, via a user device, a request for a content pod;
receiving, via the user device, one or more personal content elements for the content pod, the one or more personal content elements comprising a communication message corresponding to a user associated with the user device, the communication message having an unread status associated with the user;
assembling the content pod by combining the one or more personal content elements with at least one of an invitational content item or a bumper message describing content adjacent to the bumper message in a playback sequence associated with a content playback session; and
scheduling the content pod for playback at the user device during one or more content breaks associated with the content playback session.

18. The method of claim 17, wherein the communication message comprises an unread message sent to the user by a second user.

19. The method of claim 17, wherein the communication message comprises a social media status update associated with a social media account corresponding to the user.

20. The method of claim 17, further comprising obtaining scheduling instructions for presenting the content pod to the user device.

21. The method of claim 17, wherein the communication message comprises an unread voicemail or an unread text message stored at the user device.

22. A system comprising:
one or more processors; and
at least one non-transitory computer readable medium storing computer readable instructions that when executed by the one or more processors, cause the system to:
generate a content pod customized for a user, wherein generating the content pod comprises:
identifying at least one information source containing personal data of the user;
obtaining at least one personal content element from the at least one information source, wherein the at least one personal content element comprises a communication message having an unread status associated with the user; and
combining the at least one personal content element with at least one of an invitational content element or a bumper message describing content in a content playback session; and
generating instructions for presenting the content pod to the user during one or more breaks in the content playback session.

23. The system of claim 22, wherein the bumper message comprises a post-content bumper message describing a playback of the at least one personal content element or a pre-content bumper introducing the playback of the at least one personal content element.

24. The system of claim 22, wherein the communication message comprises a voicemail message for the user or a text message to the user.

25. The system of claim 22, wherein the at least one information source comprises an application on a user device, a storage on the user device, or a social media network associated with the user, wherein obtaining the at least one personal content element comprises identifying the at least one personal content element from the at least one information source without a search input from the user.

* * * * *

UNITED STATES PATENT AND TRADEMARK OFFICE
CERTIFICATE OF CORRECTION

PATENT NO. : 9,729,596 B2
APPLICATION NO. : 14/288122
DATED : August 8, 2017
INVENTOR(S) : Mehul K. Sanghavi et al.

It is certified that error appears in the above-identified patent and that said Letters Patent is hereby corrected as shown below:

In Claim 1, Column 20, Line 55, "for" first occurrence should be deleted.

Signed and Sealed this
Fifth Day of June, 2018

Andrei Iancu
*Director of the United States Patent and Trademark Office*